INVENTOR.
HEINZ R. WAGNER
BY
McGlew & Toren
ATTORNEYS.

United States Patent Office 3,269,391
Patented August 30, 1966

3,269,391
INDICATOR DEVICE
Heinz R. Wagner, Zurich, Switzerland, assignor to Rüegg-Naegeli & Cie. Aktiengesellschaft, Zurich, Switzerland
Filed Feb. 11, 1963, Ser. No. 257,637
Claims priority, application Switzerland, Feb. 20, 1962, 2,034/62; Aug. 30, 1962, 10,357/62
5 Claims. (Cl. 129—16.7)

This invention relates in general to indicating devices, and in particular to a new and useful indicating device particularly for use with folders, files, letters and similar materials which includes a carrier which has a raised portion at a spaced location from a margin thereof which includes a regularly defined line of markings or indications such as gearings providing reference points for aligning of indicating cards in the margin.

Indicator devices are known where cards or indicator sheets are arranged in a displaceable manner along the guide strips and wherein fixing elements make it difficult to displace the marks unintentionally. Devices of this nature, however, do not include means for holding fast or securing one or several marks or indicators in a defined or oriented position, so that these marks or indicators remain secured in such positions and can only be displaced out of their positions by particular measures such as the removal of an enclosure. A requirement for a device of this nature has arisen particularly in connection with indicating devices wherein the respective marks or indicators have to be maintained in position relative to other marks or indicators or reference points for a prolonged period of time and wherein the displacement of all of the marks or indications in their totality may be required in certain instances.

In certain operations certain papers such as purchase orders, drawings, operating instructions, etc., are formed as integral components of written matter which may be symbolized by the marks or indications and in which indicated matter may have utility for a prolonged period of time. Prior to this invention such papers had to be stored separately from the written matter with which they were associated.

In accordance with the present invention, there is provided a carrier or base element which includes means thereon defining a regularly demarcated area in the margin of the carrier bounded on a side by an aligning edge such as a saw tooth line provided for alignment of various indications of carrier strips or indicator cards, and which further includes an enclosing or holding strip which is arranged to overlie the margin or the area which holds the indicating strips.

A further object of the invention is to provide an indicating device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
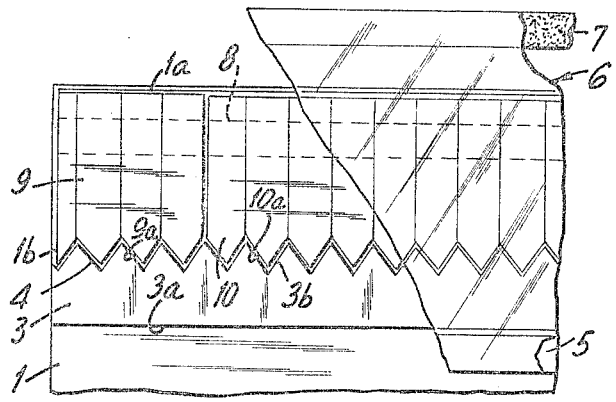
FIG. 1 is a partial front elevation of an indicating device constructed in accordance with the invention.
Figure 2:
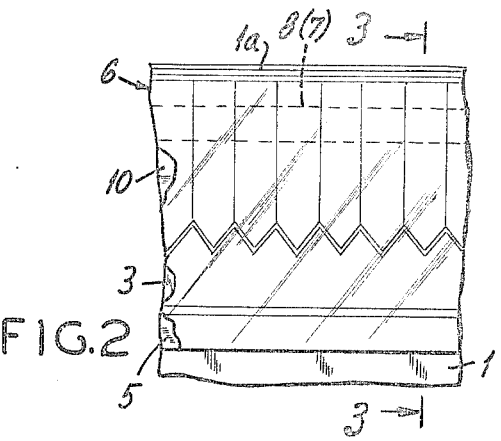
FIG. 2 is a partial front elevation of the device indicated in FIG. 1 with the closing portion indicated in a closed position.
Figure 3:
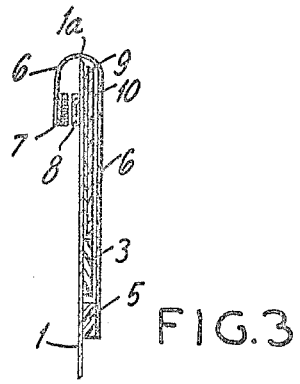
FIG. 3 is a section taken along the line 3—3 of FIG. 2.

Referring to the drawings in particular, the invention embodied therein in FIGS. 1 to 3 includes an indicating device which comprises a flat carrier or base sheet 1 which, for example, may be made of stiff paper, cardboard, plastic and the like. In some instances the carrier 1 is formed as a portion of a folder or file or secured directly to a side of such folder or file. The carrier 1 includes an upper or outer edge 1a adjacent which there is provided an indicating area 1b for aligning indicator elements or cards in accordance with the invention.

In accordance with the invention a base strip or indicating guide element 3 is secured on a front face of the carrier 1 such as by gluing. The base strip 3 includes a substantially straight edge portion 3a which is arranged parallel to the outer edge 1a and includes a locating edge or orienting means 3b which is defined at an opposite face. The indicating edge 3b is advantageously made in a saw tooth manner or with gear-like formations or gear like edge 4 to provide alignment edges or orienting means for receiving and orienting one or more indicating elements such as indicating cards 9 and 10. The cards 9 and 10 may be arranged one above the other, but they are not necessarily coextensive in length, card 10 being of less width than card 9. Thus, the base strip 3 defines an indicating area or placement area 1b on the carrier 1 between the base strip and the outer edge 1a.

The arrangement also includes a holding strip or cover device generally designated 6 which is advantageously made of a transparent material such as a plastic. The holding strip 6 is secured at one end to a securing strip 5 which is adapted to be positioned adjacent the straight edge 3a of the base strip 3 and advantageously includes means for securing it to the carrier such as an adhesive coating on its underface. The holding strip 6 extends over the entire length of the carrier and is of a width so that the opposite edge from the securing strip 5 may be directed around the edge 1a of the carrier. This opposite edge carries a securing strip element 7. The strip element 7 may advantageously comprise a textile adhesive strip which may be adhesively secured to a similar textile adhesive strip 8 carried on the rear face of the carrier 1. Other clamping elements may be employed for the strips 7 and 8. Thus, it can be seen that the holding strip or cover 6 is releasably secured at each end portion to the carrier.

The functioning and use of the indicating device is as follows:

When the holding strip 6 is opened such as by releasing the adhesive strip 7 from the adhesive strip 8, the indicating cards or carriers 9 and 10 may be arranged or positioned in alignment with the saw tooth edge 3b, as desired. Card 9, for example, may carry scales which are defined at locations between the points of the saw tooth line 3b and the card 10 may, for example, carry color indications located on similarly defined areas between the points of the saw tooth line 3b. An important feature of the construction is that the indicators or scales 9 and 10 include taw sooth edges 9a and 10a which may be aligned in proper registry with the saw tooth edges 3b on the base strip 3. The width of the cards 9 and 10 are such that they fit within the area 1b which is defined between the base strip 3 and the edge 1a. After the cards are placed in proper position, the holding strip 6 is again bent around the upper edge 1a of the carrier 1 and is secured on the rear side of the carrier by means of the securing strips 7 and 8. Thus, it can be seen that the cards 9 and 10 are held in a fixed manner on the indicating area 1b by the holding strip 6 and the whole carrier may be transported with the cards in the indicating position. The indicating device which may be associated with a suspension file or similar folder can then be stored in any position without the indicators 9 and 10 being disturbed or changing their position.

By constructing the cards 9 and 10 so that they have the same type of saw tooth edge as the saw tooth line 3b of the base strip 3, it is assured that the indications or scales on the cards may be properly aligned in respect to other portions of the carrier 1. Division lines on the scales or on the cards 9 and 10 are advantageously made to align with the points of the saw tooth defined by the line 3b. Indicating devices of this character can be used not only in connection with storage folders, but also in connection with individual plans, formulas, tables, folded sheets and the like.

Figure 4:
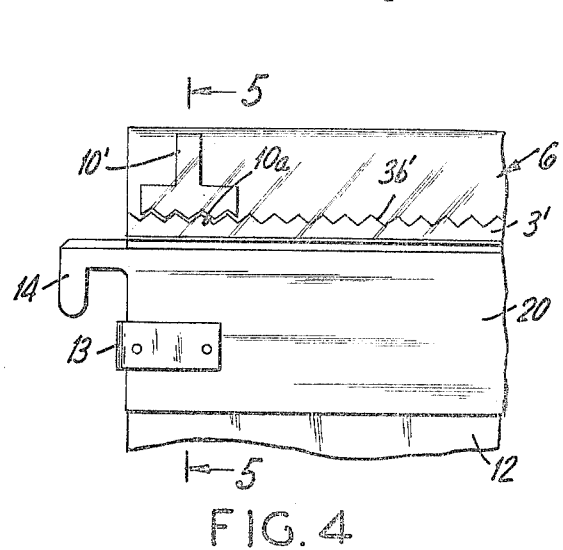
FIG. 4 is a partial front elevational view of another embodiment of the invention.
Figure 5:
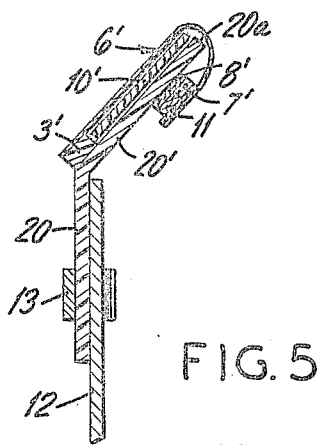
FIG. 5 is a section taken along the line 5—5 of FIG. 4.

In FIGS. 4 and 5 there is indicated another embodiment of the device which comprises the carrier 20 which may advantageously be of a form which permits it to be secured to a set of plans, formulas, letters, files, etc., such as indicated generally by the reference numeral 12. For this purpose the carrier 20 may advantageously be secured to the file 12 such as by U-shaped resilient clamping elements 13 arranged at each edge.

The carrier 20 in the embodiment of FIGS. 3 and 4 includes an angled portion 20' which is provided with a base strip 3' in a manner similar to the other embodiment. This base strip 3' may, for example, be glued on one face of the carrier 20 at the location of the juncture of the angle portion 20'. The angle portion 20' is such that the upper face thereof may be easily viewed and may advantageously carry an indication as in the previous embodiment. For this purpose the base strip 3' is provided with a saw tooth edge to provide an alignment edge for receiving an index card or similar indicator 10'. In this embodiment a holding strip 6' is secured directly to the base strip 3' and its free edge extends sufficiently to overlap around an edge 20a formed at the end of the angled portion 20'. Similarly to the other embodiment, the underside of the angled portion 20' is provided with a textile material adhesive strip 8' which has the adhesive exposed on the outside face for engagement with a similar textile adhesive strip 7' which is secured to the end of the holding strip or cover 6'. The free end of the holding strip 6 is provided with an end strip 11 on the side which faces the carrier 20'. The end strip 11 carries the adhesive strip 7'.

The base strip saw tooth edge 3b' is of a thickness to insure that the card or index element 10' will not be removed from alignment of its edge 10a' with the saw tooth line 3b' when the cover 6' is closed. When the cover element 6' is opened, however, the card 10' may be easily manipulated in order to displace the alignment of the saw tooth edges 10a' with the saw tooth edges 3b'. The saw tooth edges thus define a means for providing an index for characterizing any indicated factual situation. The indicating device advantageously includes an end hook portion 14 formed at one or more ends which permits the manipulation of the indicator in respect to a file 12 with which it is to be associated. The clamps 13 which are employed for securing the indicator to the file 12 may be advantageously made of a synthetic material or spring steel. In some instances it is desirable to include press button fastening elements on the plans and the indicating device for securing purposes rather than the clamps 13.

The hook-shaped elements 14 also provide means for suspending the indicator and the files associated therewith on suspension members or rails for the purpose of suspending the material in a file with the indicators readily visible.

While specific embodiments of the invention have been shown and described in detail to illustrate the application of the inventive principles, it will be understood that the invention may be embodied otherwise without departing from such principles.

What is claimed is:

1. An indicating device for a file, folder or similar article comprising a carrier having a front side and a rear side and a straight edge, a base strip secured to the front side of said carrier at a location spaced from said straight edge and having an edge extending above the surface of said carrier with gear-like formations facing the edge of said carrier, at least one indicator located between said base strip raised edge and said carrier edge having an orienting edge thereon with formations complementary to the gear-like formations of said raised edge and engaged with at least some of the gear-like formations of said raised edge of said base strip, a transparent securing strip having a first edge extending across the front side of said carrier and secured thereto at a location adjacent said base strip but spaced further from the edge of said carrier than the raised edge of said base strip, said transparent securing strip extending over said carrier sheet to the edge thereof and holding said indicator in position over said carrier and being of flexible material to permit bending around the edge of the carrier sheet, said transparent securing strip including a rear portion overlying the rear side of said carrier sheet, and means for detachably securing the rear portion of said securing strip to the rear side of said carrier sheet.

2. An indicating device according to claim 1, wherein said carrier is a flat sheet.

3. An indicating device according to claim 1, wherein said carrier comprises an angled member including two flat portions disposed at an angle to each other.

4. An indicating device according to claim 3, including a file having a flat wall, said carrier being secured to said flat wall.

5. An indicating device for a file, folder or similar article comprising a carrier having a straight edge, a base strip secured to said carrier at a location spaced from said straight edge and having an edge extending above said carrier with gear-like formations facing the edge of said carrier, at least one indicator located between said base strip raised edge and said carrier edge having an orienting edge thereon with formations complementary to the gear-like formations of said raised edge and engaged with at least some of the gear-like formations of said raised edge of said base strip, a transparent bendable securing strip having a first edge extending across said carrier and secured thereto at a location adjacent said base strip but spaced further from the edge of said carrier than the raised edge of said base strip, said transparent securing strip extending over the surface of said carrier to the edge thereof and holding said indicator in position over said carrier and being bent around the edge of the carrier sheet, said transparent securing strip including a rear portion overlying the opposite side of said carrier sheet, and means for detachably securing the rear portion of said securing strip to the side of said carrier sheet opposite to the one having said base strip including a first textile strip on said securing strip and a second textile strip on said carrier on the side opposite to the one having said base strip, said second strip releasably engageable with said first textile strip, said securing strip after release of said securing means being liftable off the surface of said carrier for removing, positioning and repositioning an indicator along said base strip.

(References on following page)

References Cited by the Examiner

UNITED STATES PATENTS

| | | | |
|---|---|---|---|
| 1,764,580 | 6/1930 | Raviglione | 129—16.7 |
| 2,603,219 | 7/1952 | Jones | 129.16.7 |
| 2,736,318 | 2/1956 | Shannon | 129—16.7 |
| 2,862,323 | 12/1958 | Mascolo | 129—16.7 |
| 2,964,042 | 12/1960 | Hawley | 129—16 |
| 2,982,288 | 5/1961 | Brenasin | 129—16.7 |
| 3,071,881 | 1/1963 | Ruterbusch | 129—16.7 X |

FOREIGN PATENTS

| | | |
|---|---|---|
| 1,042,259 | 6/1953 | France. |
| 1,245,764 | 10/1960 | France. |
| 730,442 | 5/1955 | Great Britain. |

JEROME SCHNALL, *Primary Examiner*.